Sept. 27, 1932.   V. O. HERMANN   1,879,234
MACHINE FOR MAKING LOLLIPOPS
Filed Oct. 20, 1931
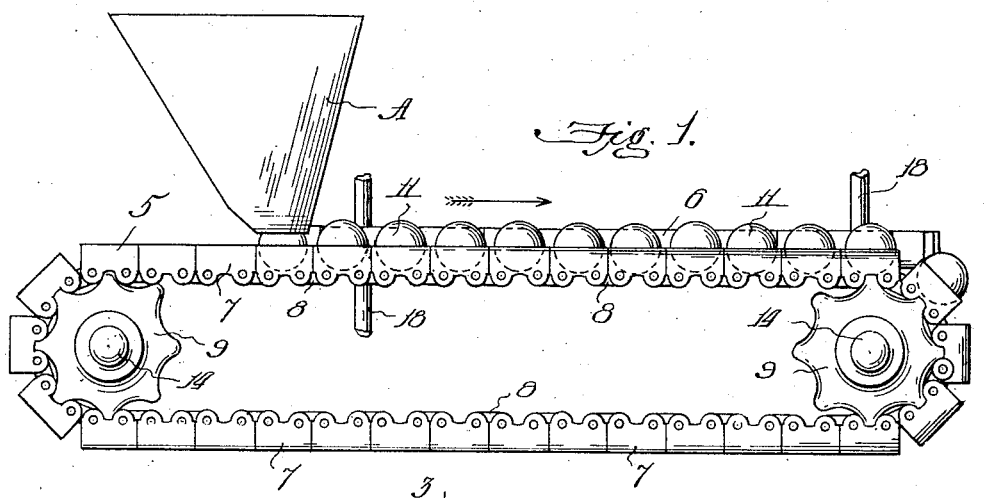
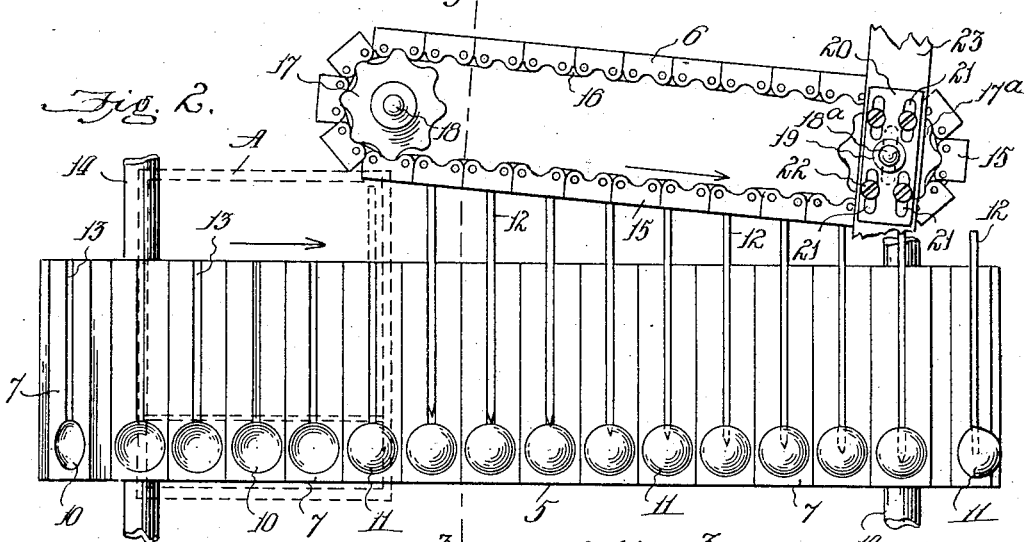
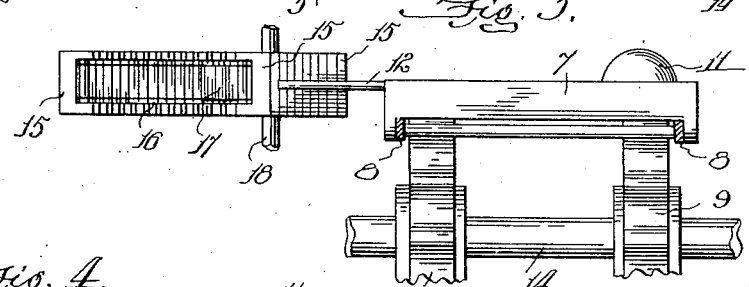
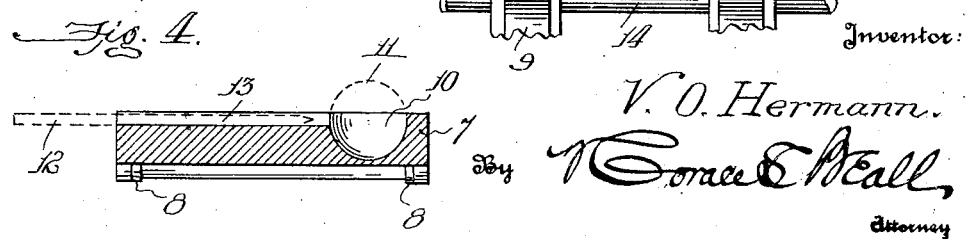

Patented Sept. 27, 1932

1,879,234

UNITED STATES PATENT OFFICE

VOLQUARDT O. HERMANN, OF NEW YORK, N. Y., ASSIGNOR TO THE V. O. HERMANN CORPORATION, OF NEW YORK, N. Y.

MACHINE FOR MAKING LOLLIPOPS

Application filed October 20, 1931. Serial No. 570,014.

My invention relates to machines for making candy confection of the kind commonly known as lollipops or suckers consisting of a lump of candy or other confection impaled on the end of a stick used as a handle in consuming the confection.

In machines of this character the lump of candy is molded between suitable dies, as for instance revolving cylinders having opposing recesses corresponding with the shape of the candy to be impaled on the stick, and provided with a groove on a line with the recess or mold to receive the stick which is inserted by means of a plunger thus requiring an intermittent motion of the machine for the operation of the plunger.

The principal object of my invention is to provide a machine or apparatus designed especially for the purpose of receiving the lumps of candy or other confection from the molds and inserting the sticks by a continuous operation to thereby increase the rate of production, in the present instance employing a continuously moving chain-belt having recesses to receive the confection and stick on a line with each other transversely of the belt in cooperation with means as a second chain-belt disposed at an angle to the aforementioned belt at one side thereof and operated at the same rate of speed so as to engage the ends of the sticks and force them into the confection, as hereinafter fully described and more specifically set forth in the appended claims.

In the drawing:—

Figure 1 is a side elevation of my improved form of apparatus for assembling the lollipops or suckers.

Fig. 2 is a plan view thereof.
Fig. 3 is a sectional view on the line 3—3 of Fig. 2, and Fig. 4 is a detail sectional view of one of the links which carry the confection and stick.

My invention is usable in connection with any type of machine for molding the lumps of candy or other confection to be impaled on a stick and for feeding the sticks as well as the confection to an assembling apparatus hereinafter described embodying my invention, and for the purpose of illustration I have shown a hopper A as the means for delivering these articles from the candy making machine on to a chain-belt forming part of my improved assembling apparatus.

In carrying out my invention I employ a carrier belt 5 on to which the lumps of confection and sticks are deposited from the hopper of the molding machine including the stick feeding device, and use in association therewith a pusher device, as belt 6, located alongside of said carrier belt and at an angle thereto with the intervening space diminishing in the direction of the running of said belts whereby as the lumps of candy and sticks are moved along by the carrier belt the sticks will be gradually pushed into the candy in assembling the articles to complete the production of the lollipops or suckers discharged from the end of the carrier belt, it being desirable that the carrier and pusher belts run at a corresponding rate of speed to prevent any dragging of the interengaging parts of the assembling apparatus.

The preferred form of carrier belt as illustrated in the drawing is made up of a series of blocks 7 connected by links 8 constituting a chain-belt passing over spaced sprocket wheels 9, each block being provided near one end with a recesses or depression 10 to receive the lump of confection 11 and therefore corresponding in shape therewith, and to receive the stick 12 on which the confection is impaled there is a groove 13 extending from recess 10 to the opposite end of the block from which latter the stick projects as illustrated in Fig. 2. The formation of the recess and groove are such that the stick will enter the center of the lump of candy seated in the recess, and although I have shown the lump of candy as round like a golf ball the said recess may be of any other desired shape to correspond with the lump to be impaled on the end of the stick carried by the chain-belt, the stick confined in the groove being of such length as to extend from a point near the lump of candy to and beyond the opposite end of the block forming part of the chain belt when the articles are deposited from the hopper on to the chain-belt to be assembled. The sprocket wheels 9 are mounted on shafts 14 suitably geared to the candy making machinery so as to operate synchronously therewith for the delivery of the molded confections and sticks on to the chain belt in the recesses and grooves of the blocks.

The chain-belt 5 carrying the lumps of confection and sticks travels in the direction of the arrow, Fig. 1, and for the purpose of pushing the sticks into the confection during the movement of said belt I provide a pusher device presenting a surface disposed at an angle to said carrier belt or inclined towards the discharge end of the latter so that the sticks engaging the same will be gradually pushed into the confection. Although any desired form of inclined surface may be provided to cooperate with the carrier chain-belt in pushing the sticks into the lumps of confection during the continuous movement of said belt I prefer to employ a belt which may be and preferably is constructed in a manner similar to said carrier belt; that is to say it is composed of blocks 15 connected by links 16 and running over spaced apart sprocket wheels 17, 17a mounted on shafts 18, 18a also geared to the candy making machinery so that the stretch of the belt operating on the sticks will travel at a rate of speed corresponding with the travel of said sticks and thus prevent any dragging with respect to either one of the interengaging parts.

For the purpose of adapting the device for sticks of different lengths as well as regulating the depth to which the pointed end enters the lump of confection that end of the pusher device nearest the carrier belt may be and preferably is adjustable radially with the shaft 18 as the axis, and to this end shaft 18a is mounted in an adjustable bearing 19 of any approved construction, as for instance said bearing may be formed integrally with an attaching plate 20 having slots 21 through which bolts 22 pass into the supporting plate 23 for securing the desired adjustments.

The operation of the apparatus for assembling the lump of confection and stick forming the lollipop or sucker will be understood from the foregoing description in connection with the accompanying drawing, for as the confection and stick are deposited on one of the blocks of the chain-belt carrier with the stick in the groove on a line with the recess or depression in which the confection is seated the movement of the pusher chain-belt at the same rate of speed as the carrier belt will operate to engage the sticks successively and push them into the confection as the inner stretch of said pusher belt moves towards the discharge end of the carrier belt, from which latter the completed article is discharged. As will be obvious therefore my improved assembling apparatus provides for inserting an end of the sticks into the confection by a continuous operation, and although I have shown a chain-belt for pushing the sticks other analogous means may be employed in connection with the continuously moving carrier belt, and other modifications may be made within the spirit and scope of the appended claims.

I claim:—

1. An apparatus for assembling lollipops comprising an endless carrier belt having a recess to receive the confection and a communicating groove to receive the stick, said groove extending to and opening out at one side of the carrier belt; together with means disposed at an angle to the travel of the carrier belt and directly engaging the outer ends of the sticks to push them into the confection during the movement of said carrier belt.

2. An apparatus for assembling lollipops comprising an endless carrier element having a recess to receive the confection and a communicating groove to receive the stick, said groove extending to and opening out at one side of the carrier element beyond which latter the stick projects, and means disposed at an angle to the carrier element at one side thereof to directly engage the projecting ends of the sticks and push them into the confection during the movement of the carrier element.

3. An apparatus for use in connection with a candy making machine for assembling a lump of confection and stick on which it is impaled comprising a carrier belt consisting of blocks connected by links to pass over spaced apart sprocket wheels, said blocks each having a recess to receive the confection and a groove in line with said recess to receive the stick; together with a pusher belt disposed at an angle to the travel of the carrier belt to engage the sticks and force them into the lumps of confection during the travel of said carrier belt.

4. An apparatus for use in connection with a candy making machine for assembling a lump of confection and stick on which it is impaled comprising a carrier belt consisting of blocks connected by links to pass over spaced apart sprocket wheels, said blocks each having a recess to receive the confection and a groove in line with said recess to receive the stick, the groove opening out at one side of the belt for the stick to project beyond said belt; together with means disposed at an angle to the travel of the carrier belt for directly engaging the projecting ends of the sticks to push them into the lumps of confection during the travel of the carrier belt.

5. An apparatus for use in connection with a candy making machine for assembling a lump of confection and stick on which it is impaled comprising a carrier belt consisting of blocks connected by links to pass over spaced apart sprocket wheels, said blocks each having a recess to receive the confection and a groove in line with the recess to receive the stick, the groove opening out at the end of the block for the stick to project beyond said block at the opposite end thereof from the confection; together with a pusher belt disposed at an angle to the carrier belt at the side thereof from which the ends of the sticks project to directly engage the sticks and push them into the lumps of confection during the travel of the carrier belt, said belts being operated at a corresponding rate of speed.

6. An apparatus for use in connection with a candy making machine for assembling a lump of confection and stick on which it is impaled comprising a carrier belt consisting of blocks connected by links to pass over spaced apart sprocket wheels, said blocks each having a recess to receive the confection and a groove in line with said recess to receive the stick; together with a pusher-belt disposed at an angle to the travel of the carrier belt for engaging the sticks to push them into the lumps of confection, and means for adjusting said pusher-belt relative to the carrier belt to accommodate sticks of different lengths.

VOLQUARDT O. HERMANN.